May 23, 1967   H. R. BROWNELL   3,321,707
A.C. AND D.C. WATTMETER USING RECTIFIERS
AND DIFFERENTIAL INDICATOR
Filed Sept. 20, 1963                                    2 Sheets-Sheet 1

WITNESS
William Martin Jr.

INVENTOR.
H. Russell Brownell
BY
Marshall J. Breen
ATTORNEY

United States Patent Office 3,321,707
Patented May 23, 1967

3,321,707
A.C. AND D.C. WATTMETER USING RECTIFIERS AND DIFFERENTIAL INDICATOR
Harry Russell Brownell, Larchmont, N.Y., assignor to The Singer Company, New York, N.Y., a corporation of New Jersey
Filed Sept. 20, 1963, Ser. No. 310,236
5 Claims. (Cl. 324—142)

This invention relates to wattmeters and more particularly to wattmeters having low phase error. In another aspect thereof, this invention relates to compensation of error attributable to current through the voltage circuit of a wattmeter.

As a general rule the electrodynamic type of wattmeter provides a useful instrument for measurement of power at relatively low frequencies. However, the reactance of the two coils of this type of meter limits its accuracy at higher frequencies.

Accordingly, thermocouple and rectifier-Thyrite type silicon carbide resistor instruments such as those disclosed by Massa in United States Patent No. 2,059,594 have been devised in order to reduce the effects of inductive reactance in a meter to be utilized over a broad range of frequencies. As indicated by Massa, the thermocouple type of instrument is limited to relatively low power levels because at high temperatures the life of a thermocouple is very short and inductive surges and the like can cause their deterioration rather easily.

In the circuit shown by Massa in FIG. 2 of the above patent, the output circuits of the two full-wave rectifier bridges are connected in opposition. Accordingly, the circuits marked AB and CD in the Massa patent must be isolated by transformers such as 3, 4 and 9 as shown in the patent or by amplifier circuitry, as otherwise the circuit would be inoperative. Use of transformers detracts from the accuracy of the response of the circuit particularly at high frequencies. Use of amplifiers which provides an alternative solution, adds to the cost and complexity of the circuit.

Another basic problem with the circuit shown by Massa is the use of Thyrite type silicon carbide resistors which are sold by General Electric Company, Edmore, Mich. Thyrite resistors are described by the above manufacturer in sales literature designated by catalog number TY–101–A–5M–5/57 as having a change in resistance at constant voltage from −0.4 percent to −0.73 percent per degree centigrade over the temperature range from 0 to 100° centigrade. Such a temperature coefficient of resistance is excessive for the type of accuracy desirable in a highly accurate wattmeter.

Another source of error in any instrument containing a transformer is the variation of its inductive reactance as a function of frequency. Accordingly, in cases in which high accuracy is desirable, the desideratum is to have as little inductance and capacitance as possible included in the alternating current circuits of the meter. If a transformer is necessary, say for the purpose of providing a multirange shunt circuit utilizing a multitapped autotransformer as described below, then it is desirable to minimize the effects of transformer reactance upon operation of the circuit.

Another source of error which has been recognized in connection with certain forms of the electrodynamic type of wattmeter is the current which flows through the shunt circuit from the voltage circuit. Compensation is necessary if meter readings are desired to be as close to optimum accuracy as possible, particularly in the case of measurements of small quantities of power. Accordingly, it is desirable that means be provided in rectifier type wattmeters for compensation for the current through the voltage circuit of the wattmeter. Moreover, it is desirable that any current transformer used to measure power be compact and that the power dissipated by the shunt circuit and the instrument be small. The electrodynamic type of wattmeter consumes considerable power and requires a relatively large current transformer.

Instruments of the kind shown in the Massa patent are of course limited to use for measuring alternating-current power. An A.C.-D.C. instrument capable of measuring power is more useful than the above because of its versatility and ease of calibration with D.C. sources of power.

In accordance with my invention a wattmeter is provided including a pair of rectifier units each having an input circuit and an output circuit and each providing substantially a square law relationship between input signals and the output signals produced by them. An indicator is provided including a pair of input circuits and an element providing indication differentially in response to signals supplied to the input circuits. Each of the input circuits of the indicating means is connected to the output circuit of one of the rectifier units.

Further in accordance with my invention, a voltage input circuit having a first terminal and a shunt for coupling to a current input are provided. A first rectifier unit is connected between the first input terminal and one end of the shunt. A second rectifier unit is connected between the first input terminal and the other end of said shunt. The rectifier units are adapted to permit reciprocal conduction therethrough between the first input terminal and the ends of the shunt. Each of the rectifier units has a resistor connected in parallel therewith between the first input terminal and one end of the shunt. An indicating device including a pair of input circuits which is actuable to provide differential response to signals supplied to the input circuits is connected with one input circuit in series with at least one of the rectifiers in each one of the rectifier units.

Further aspects of my invention are described below with reference to the attached drawings in which.

Figure 1:
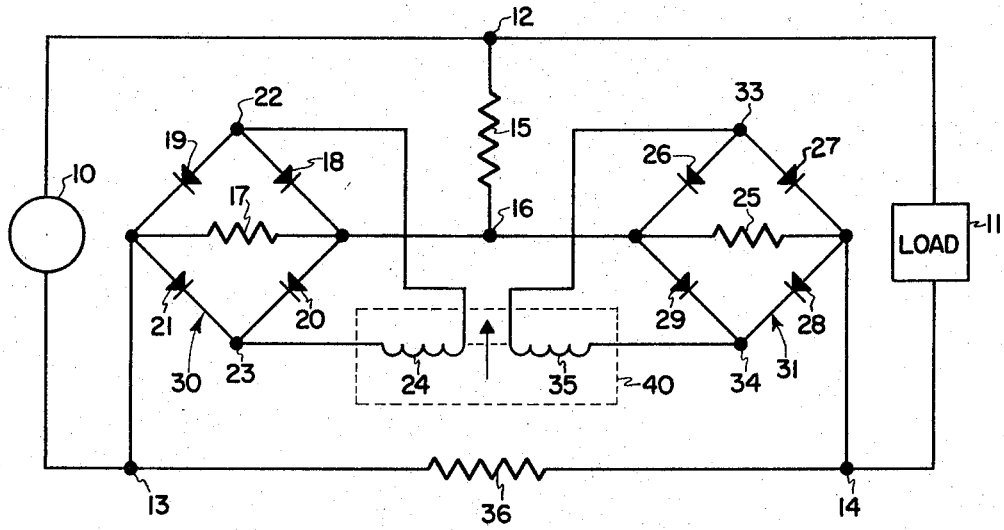
FIG. 1 shows an electrical schematic drawing of an A.C.-D.C. wattmeter connected to measure power.

Referring to FIG. 1, numeral 10 designates a power supply connected to a load 11. A wattmeter is connected at terminal junctions 12, 13 and 14 to measure the power delivered to the load. Connected to junction 12 is a resistor 15 connected at the opposite end thereof to junction 16.

Connected between junction 16 and junction 13 is a resistor 17 connected in parallel with two pairs of diode rectifiers 18, 19 and 20, 21. The diodes 18, 19, 20 and 21 are connected to form a first full-wave rectifier bridge 30 with output terminals 22 and 23 between the anodes of diodes 18 and 19 and the cathodes of diodes 20 and 21 respectively.

A first moving coil 24 of a differential moving coil fixed permanent magnet instrument 40 (of the type described by H. Russell Brownell et al. in an article entitled, "Lesser Known Uses of Electrical Instruments," Handbook of Electrical Instruments, page 16, Instruments Publishing Company, Inc., 1963) is connected across terminals 22 and 23. Instrument 40 serves as an indicating device.

Connected between junction 16 and junction 14 is a resistor 25 connected in parallel with two pairs of diode rectifiers 26, 27 and 28, 29. The diodes 26, 27, 28 and 29 are connected to form a second full-wave rectifier bridge 31 with output terminals 33 and 34 between the anodes of diodes 26 and 27 and between the cathodes of diodes 28 and 29 respectively.

A second moving coil 35 of the differential instrument 40 is connected across terminals 33 and 34.

A shunt resistor 36 is connected between junctions 13 and 14, while the source is connected between junctions 12 and 13 and the load is connected between junctions 12 and 14.

Diode bridges 30 and 31 are composed of matched diode rectifiers 18, 19, 20, 21, 26, 27, 28, and 29 selected to provide a substantially square-law relationship between voltages supplied across the inputs thereto and the output currents supplied to moving coils 24 and 35 connected in the output circuits thereof. Such square-law response may be obtained over a substantial range of potentials depending upon the characteristics of the circuit as is described in greater detail below.

*Operation*

Power supply 10 may be a direct current or alternating current source. For clarity and simplicity of explanation of operation power supply 10 is first assumed to be a D.C. source with the potential on junction 12 positive with respect to the potential on junction 13, although the polarity can be reversed, as is described below.

Accordingly, current will flow from power supply 10 through junction 12 dividing between resistor 15 and load 11. Current flowing through resistor 15 will divide at junction 16, with some of that current passing through resistor 17 and some current passing in parallel therewith through the series combination of diode 20, coil 24, and diode 19 and thence to junction 13 and to the opposite terminal of supply 10. The balance of the current passing from junction 16 will pass through resistor 25 and in parallel therewith through the series combination of diode 29, coil 35 and diode 27, thence through junction 14 and resistor 36 to supply 10. Small, but negligible reverse currents will pass through the remaining diodes. The current through load 11 will pass through junction 14, resistor 36 and junction 13 to supply 10.

Accordingly, because of current through shunt resistor 36, a potential will develop thereacross with a relatively higher potential at junction 14 than junction 13.

The current flowing through shunt resistor 36 will be the sum of currents flowing through load 11 and from junction 16 through resistor 25 and coil 35 to junction 14. Assuming that the circuit is well designed, it is necessary that the load current through load 11 is relatively large and the current flowing from junction 16 to junction 14 is relatively small, the potential across resistor 36 will be substantially directly proportional to the load current. Thus, assuming that resistors 17 and 25, bridges 30 and 31 and coils 24 and 35 are identical, the current from junction 16 to junction 13 will exceed the current from junction 16 to junction 14 as a function of the IR drop across shunt 36 which is responsive to current through load 11.

Assuming for purposes of explanation, load 11 is an open circuit there will be substantially no potential drop across shunt resistor 36. Accordingly, substantially equal currents will flow through resistors 17 and 25 developing equal potentials drops across the input terminals of rectifier bridges 30 and 31. Thus the currents through moving coils 24 and 35 will be equal. With appropriate polarity connections of coils 24 and 35, the flux induced by those coils will be in opposition and thus there will be no deflection of the indicator of instrument 40 in response to those currents.

Assuming, hypothetically, that load 11 is a short circuit with current flowing from load 11 into junction 14, a current will flow from junction 14 through junction 16 to junction 13. The IR potential developed across resistor 25 in response thereto, will cause current to flow through diode 28, coil 35, and diode 26 and equal IR potential across resistor 17 will cause an equal current to flow through diode 20, coil 24 and diode 19. The currents in coils 24 and 35 will produce equal and opposing fluxes, with no deflection of the indicator of instrument 40 in response thereto.

Now returning to consideration of operation of the circuit with a normal resistive load 11, consider the effect of the combined currents on the potential across resistors 17 and 25, in accordance with the superposition principle as applied to circuit analysis. The voltage circuit current flowing through resistor 15 flows through resistors 17 and 25 producing substantially equal currents $I_v$ each of which is proportional to the potential at the junction 12 with respect to the potential on junctions 13 and 14 respectively. Another current $I_i$ flows from junction 14 to junction 13 through junction 16. The voltage across resistor 17 represents the product of the sum $(I_i+I_v)$ times the resistance of resistor 17 because the two currents flow in the same direction. The voltage across resistor 25 is the product of the difference $(I_v-I_i)$ times the resistance of resistor 25 because the currents $I_v$ and $I_i$ flow in opposite directions.

The total torque on the instrument will be proportional to the difference between squares of the potentials developed across resistors 17 and 25 because of the square-law response of bridges 30 and 31. Accordingly the deflection of the instrument will be proportional to $$(I_v+I_1)^2-(I_v-I_1)^2=(I_v^2+2I_vI_1+I_1^2)-(I_v^2-2I_vI_1+I_1^2)$$

or $4I_vI_1$. The product $I_vI_1$ is proportional to the power dissipated by the load, since $I_v$ is proportional to the potential across the load and $I_i$ is proportional to the current through the load.

Should potential polarity of supply 10 be reversed, i.e. with potential at junction 13 exceeding potential at junction 12, then currents $I_v$ would flow from junctions 13 and 14 to junction 16. Current $I_i$ would flow from junction 13 to junction 14 through junction 16. Assuming $I_v$ to be greater than $I_i$ and realizing that the potential at junction 13 would exceed the potential at junction 16, it follows that the net current from junction 13 to junction 16 would flow through diode 21, coil 24, and diode 18 to junction 16. Similar analysis, assuming $I_i$ to be greater than $I_v$ will show that current would flow in the same direction through coil 17 as in the reverse situation just described. Since the potential at junction 14 would normally exceed potential at junction 16, current would flow through diode 28, coil 35 and diode 26 to junction 16. The square-law sum of the currents $I_v$ and $I_i$ would be measured by coil 24 and the square-law difference between the currents $I_v$ and $I_i$ would be measured by the coil 35. Thus, the same deflection would be obtained as for the opposite polarity.

During alternating-current operation of this circuit, the operation of the circuit would be similar insofar as the currents in the coils 24 and 35 would produce a torque proportional to the instantaneous product of $I_v$ and $I_i$ thereby taking in account the phase relationship between current and potential supplied to the load. Accordingly, since the actual deflection of the indicator is relatively slow because of its inertia, the instrument will indicate in proportion to the integral of the product of voltage and current thereby providing an R.M.S. indicaton of power delivered to the load.

Figure 2:
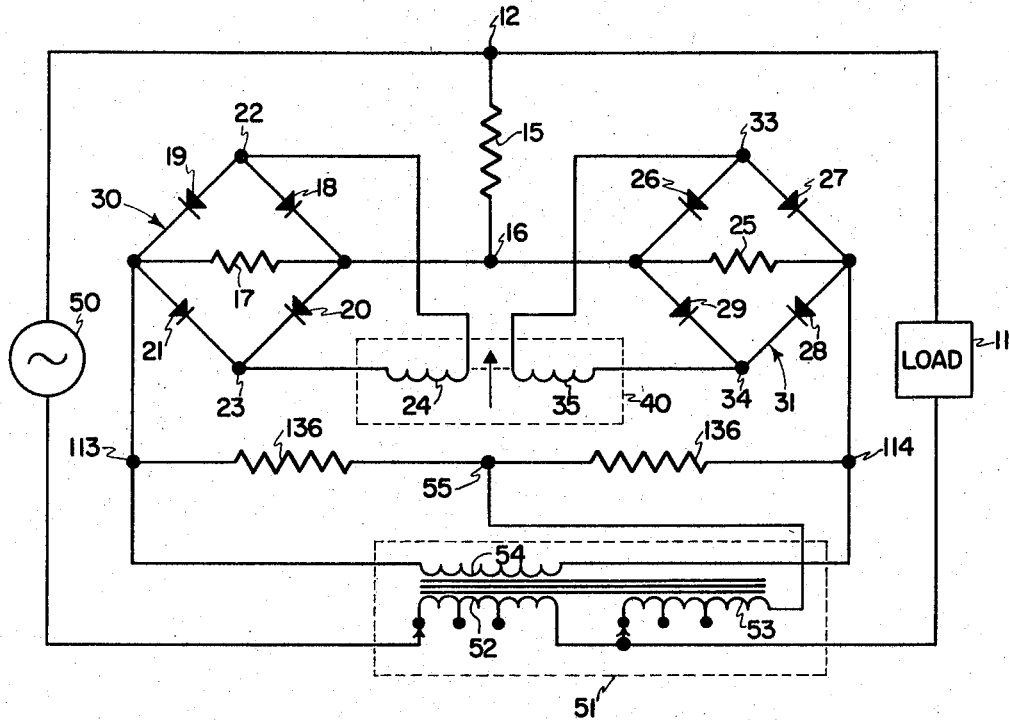
FIG. 2 shows an electrical schematic drawing of an A.C. wattmeter of similar design to that shown in FIG. 1 connected to measure power.

Referring to FIG. 2 like numerals are used to describe parts which are identical to those shown in FIG. 1. FIG. 2 shows a wattmeter similar to the wattmeter shown in FIG. 1, but which is suitable for measuring only alternating current power. Accordingly, the power supply 50 is an alternating current source. A major difference between this circuit and that shown in FIG. 1 is the use of a current transformer 51 having a primary winding 52, a compensating winding 53, having a number of turns substantially equal to that of the primary winding 52, and a secondary winding 54, with the primary winding connected in series with the load and power supply 50. The secondary winding is connected at junctions 113 and 114 across two matched shunt resistors 136 connected in series and respectively to the ends of resistors 17 and 25 opposite junction 16. One end of compensating winding 55 is connected to a junction 55 between resistors 136 and the other end of winding 55 is connected to the end of load 11 opposite junction 12. Circuit structure is otherwise identical to that shown in FIG. 1.

In operation, the circuit of FIG. 2 offers two advantages over that shown in FIG. 1. First, the voltage current $I_v$ between junction 16 and junction 114 will in effect cause no voltage drop across the shunt because of use of compensating winding 53. Second, the current transformer 51 can be designed to be a variable range transformer, thereby facilitating use of the meter for a number of ranges of operation. Description of the manner in which these advantages may be obtained is found below.

One problem associated with wattmeters is that they may measure, in addition, to the power dissipated by the load, some of the power dissipated by the wattmeter. Here, by causing voltage currents $I_v$ flowing from junction 12 through resistor 15 to junction 55 to flow through compensating winding 53, the compensating winding may be utilized to buck out flux induced by voltage currents $I_v$ which pass through primary winding 52. In other words, the flux induced by winding 53 in the core of transformer 51 bucks out substantially all flux induced by primary winding 52 in response to voltage currents $I_v$, thereby correcting for the excessive current that would otherwise flow through secondary winding 54, which determines the potential across shunt resistors 136. The rectifier bridges 30 and 31 shown in FIGS. 1 and 2 may be referred to as R.M.S. transducers. Similar circuits have been described by Bossart in U.S. Patent No. 1,715,446 and by Massa using a Thyrite addition to a linear type bridge in the patent referred to above. The rectifier bridge circuit shown herein includes a shunt resistor 17 or 25 across the input terminals whereas Bossart shows no resistor thereacross except shunt S in FIG. 2. Massa shows a resistor 18 or 21 across the output terminals of the rectifier bridge. The basic feature of all of these circuit is that they all provide a square-law transfer characteristic between input potential and output current. It has been determined as a result of substantial experimentation that in order to obtain optimum square-law response from the type of R.M.S. transducer described herein that the diodes used should be carefully matched and the resistance shunting the input circuit should be carefully selected to provide the desired response over a predetermined range of operation.

*Example*

Figure 3:
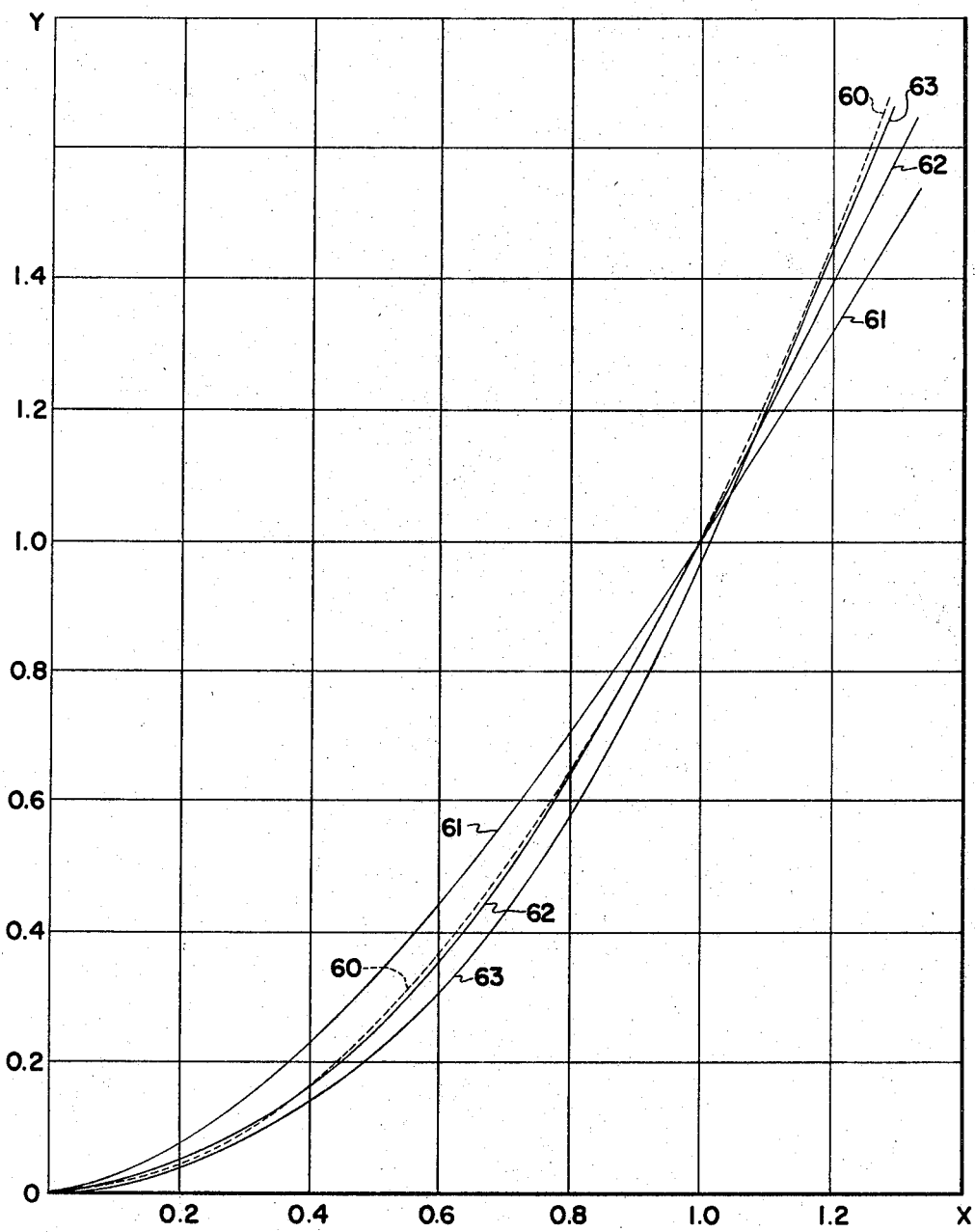
FIG. 3 is a graph illustrating the electrical characteristics of the transducer circuit shown in FIGS. 1 and 2 for various values of resistance across the output circuit of the transducer in comparison with square-law response indicated by the dotted line.

Referring to FIG. 3, normalized experimental data obtained from an R.M.S. transducer is shown with the X axis indicating input voltage and the Y axis indicating output current.

Curve 60 shows a mathematically calculated square-law relationship between the value of current on the Y axis and voltage represented on the X axis with the curve passing through unity on both axes.

Matched pairs of diodes were combined with an optimum load resistance for this type of application.

The resistance value of the element connected across the output of the bridge, i.e., coil 24 or 25, is all important to obtaining the desired result. Curves 61, 62, and 63 were obtained for relatively low, medium and high resistance values of the coil connected across the output of the bridge. It may be seen that the curve 62 follows the square-law curve 60 very closely for X and Y values up to about unity. Many changes can be made in the design of the type of wattmeter described above. For optimum operation, it is suggested that the moving coil assembly of the instrument 40 can be supported by a taut band type of suspension.

Because a differential instrument is used, very little power need be supplied to the moving coils, and, accordingly, a very small current transformer may be utilized. Thus the power drain of the meter is relatively low in comparison with the electrodynamic type of wattmeter.

Preferably, the current transformer is multirange and taps and contacts are shown on primary winding 52 and compensating winding 53 to permit adjustment to various current ranges.

Having thus described the nature of the invention what I claim herein is:

1. A wattmeter including
   a pair of rectifier units each having an input circuit and an output circuit and each providing a square-law relationship between the input and output signals thereof,
   an indicating device including a pair of input circuits actuable to provide differential response to signals supplied thereto, each of said input circuits being connected to the output circuit of one of said rectifier units,
   a shunt circuit including a shunt resistor having a centertap and a transformer having a primary winding, a secondary winding, and a compensating winding, said shunt resistor being connected in parallel with said secondary winding,
   said secondary winding connected at each end thereof to one end of the input circuit of each of said rectifier units, the opposite ends of the input circuit of each of said rectifier units being connected together at a point connected to one end of a power source connected to a load, the primary winding of said transformer being connected between the opposite end of said power source and said load,
   said compensating winding being connected between said centertap and said end of said primary winding connected to said load to produce a flux in opposition to flux developed in the primary of said transformer in response to currents passing through one of said wattmeter rectifier units and said primary winding.

2. A wattmeter including
   a voltage input circuit having a first input terminal connected to one end of a power source which is connected to a load,
   a shunt resistor,
   a first rectifier unit including at least a pair of rectifiers connected between said first input terminal and one end of said shunt resistor,
   a second rectifier unit including at least a pair of rectifiers connected between said first input terminal and the other end of said shunt resistor,
   said rectifiers in each of said first and second rectifier units being connected to permit forward and reverse conduction with respect to said first input terminal and said shunt resistor through each said rectifier unit, and each said unit including a resistor connected in shunt therewith between said first input terminal and an end of said shunt resistor,
   indicating means including a pair of input circuits actuable to provide differential response to signals supplied thereto, each of said input circuits being connected in series with at least one of said rectifiers in one of said rectifier units, betwen said first input circuit and said shunt,
   a current transformer having a primary winding, a secondary winding, and a compensating winding, said primary winding being connected to conduct current between the other end of said power source and the load,
   said secondary winding being connected across said shunt resistor, said compensating winding being connected at one end thereof to a point intermediate the ends of said shunt the other end of said compensating winding being connected to one end of said primary winding,
said compensating winding having a number of turns substantially equal to the number of turns of said primary winding.

3. A wattmeter including
a pair of full wave rectifier units each having an input circuit and an output circuit and each providing a square law relationship between the input and output signals thereof,
an indicating device comprising a differential, two moving coils, permanent magnet instrument including a pair of input circuits each connected internally respectively to one of said moving coils actuable to provide differential response to signals supplied thereto, each of said input circuits being connected externally to the output circuit of one of said rectifier units, a shunt resistor, the input circuits of said rectifier units being connected together at one end of each to a point connected to one side of a power source which is connected to one side of a load, and at the opposite ends of each input circuit to opposite terminals of said shunt resistor, said shunt resistor being connected to carry at least a portion of the current passing from the other side of said power source to the other side of said load.

4. A wattmeter in accordance with claim 3 wherein said shunt is connected directly in series between said other side of said power source and the load to conduct substantially all of the current passing therebetween.

5. A wattmeter including a first input terminal, a shunt resistor, first and second full-wave rectifier units each including a full-wave rectifier bridge of four diode rectifiers, a bridge resistor, two inputs and two outputs, each of said diode rectifiers being connected directly between one of said inputs and one of said outputs of the respective full-wave rectifier unit, the anodes of two diode rectifiers in each unit being connected to one of said outputs and the cathodes of the remaining two diode rectifiers in each unit being connected to the other one of said outputs, each said bridge resistor being connected respectively between said inputs of a said full-wave rectifier unit, each of said full-wave rectifier units having a substantially square law response characteristic, a differential permanent magnet indicating device including a stator with a permanent magnet and a movement carrying a pair of independent coils, each of said coils being connected across a said output of one of said full-wave rectifier units, said shunt resistor being coupled at one end to a source of power and at the other end to one side of a load, said first input terminal being connected to the opposite side of such a source of power which is connected to the other side of said load, said inputs of one of said rectifier units being connected between said first input terminal and one end of said shunt resistor, said inputs of the other of said full-wave rectifier units being connected between said first input terminal and the opposite end of said shunt resistor.

References Cited by the Examiner
UNITED STATES PATENTS

| | | | |
|---|---|---|---|
| 1,715,446 | 6/1929 | Bossart | 324—119 X |
| 2,059,594 | 11/1936 | Massa | 324—142 |
| 2,648,048 | 8/1953 | Vackar | 324—142 X |

FOREIGN PATENTS

| | | |
|---|---|---|
| 828,879 | 1/1952 | Germany. |

WALTER L. CARLSON, *Primary Examiner.*
R. V. ROLINEC, *Assistant Examiner.*